UNITED STATES PATENT OFFICE 2,510,816

WAX COMPOSITION FOR COATING FRUITS

Oliver P. Greenstreet, San Diego, Calif.; Emma L. Greenstreet administratrix of said Oliver P. Greenstreet, deceased No Drawing. Application November 7, 1946, Serial No. 708,451

2 Claims. (Cl. 106—271)

This invention relates to the art of coating fruits, vegetables and other edible produce for the purpose of preserving the article against decay and shrinkage and also for the purpose of preserving the color and the present invention is directed particularly to improvements in coating compositions designed for the coating of citrous fruit.

The present invention has for a principal object to provide a composition which is designed to be cast in blocks or slabs to be transferred to the fruit by brushes and which is more particularly designed to hold the natural shine and color of the fruit, slow down but not completely shut off the respiration of the fruit to thereby prevent excessive shrinkage, and to retard the development of mold and rot.

Another and important object of the present invention is to provide a coating composition for citrous fruits and the like which is designed to be applied to the fruit by means of the rotating brushes commonly employed for this purpose and which will not stick to and gum up the brushes and therefore require frequent stoppage of the coating process for the purpose of cleaning the brushes as is required in connection with the use of coating compositions of the character at present employed.

Still another object of the invention is to provide a coating composition of the character stated which, though containing wax, is of such character that it may be applied directly to wet fruit and will combine or mix with the water on the fruit and form the desired coating.

Still another object of the invention is to provide an improved wax and paraffin composition which is adapted to be cast into slabs or blocks for use in connection with rotating brushes for transferring the wax to the fruit and which is also of such character as to be unaffected by extreme changes of temperature thereby making it possible to use the composition in either high or low temperatures without affecting its coating qualities.

In accordance with the present invention paraffin or paraffin wax is combined in prescribed proportions with carnauba wax or any other equivalent vegetable hard wax such, for example, as candelila wax, through the action of sulfonated mineral oil or sulfonated bitumen oil. This mixture is then placed in suitable molds where it is allowed to congeal into the form of the mold whereupon it is ready for use.

By the use of this composition certain highly desirable results are obtained which cannot be obtained by the use of those wax compositions at present employed for coating citrous and other fruits.

The first of these desirable results is the retention of the natural fruit color. The use of the carnauba, or other vegetable hard wax such as candelila wax has the effect of controlling the consistency or hardness of the finished block or slab but does not cause a shine on the fruit but merely holds the natural color or shine.

After the fruit, especially citrous fruit, goes through the washing vats and brushes in the packing plant, it comes out with a very high natural color or shine and it is this that is held or retained by the present coating composition.

It is of course well known that carnauba wax is used in various polishing compositions to give a shine to surfaces such as hardwood floors, linoleum and the like but this wax does not have this action when applied to citrous fruit because of the soft character of the fruit surface. On account of this softness of the surface it is not possible to polish the wax to give a high gloss or shine but the desirable shine which the fruit has after the application of the present composition results from the preservation of the natural shine by the thin relatively hard coating which the present composition provides.

Another very desirable feature of the present coating composition is that it is of such consistency that when applied to the fruit by the usual rotating brushes it is picked up by the brushes and transferred to the fruit surface completely and without sticking to the brushes. Thus the brushes will not become loaded with the wax or gummed and require thorough cleaning every few days as is required in using the ordinary wax coating composition. Accordingly a great amount of expense is avoided in connection with the use of the present composition, as well as a perfect job of coating the fruits at all times. Such is far from the case when using the ordinary wax because the brushes start to gum up immediately after coming in contact with the slabs. The wax of the present invention never causes the brushes to gum up.

Another highly desirable feature of the present composition is that it may be applied to wet fruit as well as dry fruit with the same desirable results. It frequently happens that the fruit when it comes to the waxers is very wet as a result of the scrubbing which it receives prior to the waxing treatment. The ordinary wax slab will not transfer from the rolls to the fruit when the fruit is in this condition. In the present case, because of the presence in the mixture of the sulfonated oils, the waxes are caused to readily combine with the water and be spread over the surface of the fruit to coat the same in the same manner as would be the case if the fruit were completely dry.

In the preparation of the present composition use is made of paraffin having a melting point of from 128° to 130° F. To each 100 pounds of such paraffin from 1% to 2% of carnauba or other suitable vegetable hard wax is added and the two ingredients are heated to approximately 210° F. to effect fusion. The mixture is then cooled to approximately 200° F.

To the above mixture is added from 50 to 100 fluid ounces of sulfonated mineral oil or sulfonated bitumen oil and thoroughly mixed with the melted waxes. The mixture is then poured into molds at approximately 190° F. and allowed to cool and set or congeal into the desired solid block.

The amount of carnauba wax and sulfonated oil is varied between the extremes stated, in accordance with the temperature conditions under which the slabs are to be used.

In very hot climates where the temperature may be around 100° F. approximately 2% of the carnauba or other vegetable hard wax is used. For such use, however, the amount of sulfonated oil will be appropriately reduced and as little as 50 fluid ounces of sulfonated oil to each 100 pounds of paraffin may be employed where the atmospheric temperature is around 100° F. or more.

Where the temperature of the surrounding atmosphere may be low as, for example, around 32° F., the carnauba or other vegetable hard wax will be reduced to around 1% but under such conditions the amount of sulfonated oil is increased and may be raised to as much as 100 fluid ounces per 100 pounds of paraffin. These variations in the quantity of sulfonated oil are employed because of the tendency of the oils to soften the waxes and accordingly the hotter the working conditions the smaller the amount of oil used and vice versa.

The composition herein disclosed has had extensive use in the citrous fruit industry in both hot and relatively cool climate and has been found to give a more satisfactory coating to such fruit than the paraffin wax coating at present employed.

The coating or protective skin applied to the fruit in the use of the present composition greatly prolongs the life of the fruit as well as preserving the color and shine thereof and in the use of this composition it is never necessary to clean the brushes.

I claim:

1. A composition for coating fruits and vegetables, comprising paraffin, a vegetable hard wax in a quantity approximately 2% of the quantity of the paraffin, and a sulfonated mineral oil, the ingredients of the composition giving a body having a solid consistency suitable for application to the fruit and vegetable bodies by brushes in any atmospheric temperature ranging from 32° F. to at least 100° F.

2. A composition for coating fruits and vegetables consisting of paraffin, a vegetable hard wax in the proportion of from 1 to 2% of the paraffin, and sulfonated mineral oil in the proportion of from 50 to 100 fluid ounces to 100 pounds of paraffin, the composition being of a solid consistency suitable for application to the fruit and vegetable bodies by brushes in any atmospheric temperature ranging from 32° F. to at least 100° F.

OLIVER P. GREENSTREET.

REFERENCES CITED

The following references are of record in the file of this patent:

UNITED STATES PATENTS

| Number | Name | Date |
| --- | --- | --- |
| 1,940,530 | Brogden | Dec. 19, 1933 |
| 1,986,936 | Lewers | Jan. 8, 1935 |
| 2,070,936 | Trowbridge | Feb. 16, 1937 |
| 2,150,284 | MacRill et al. | Mar. 14, 1939 |
| 2,240,031 | Bour | Apr. 29, 1941 |
| 2,348,715 | Adams | May 16, 1944 |